Figure 1:
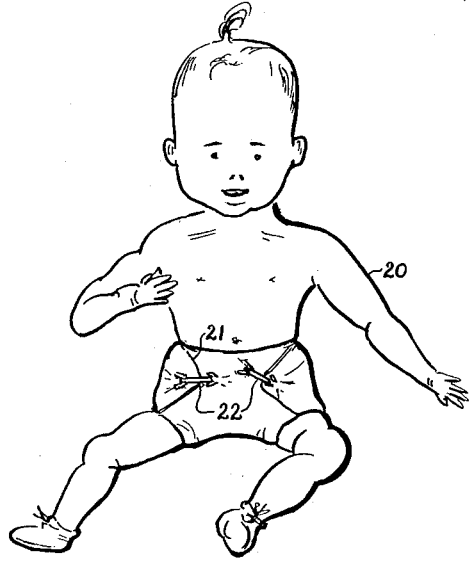

March 31, 1964     J. M. DE MARRE     3,126,600

FASTENER

Filed June 5, 1961

INVENTOR.
JOHN M. DEMARRE
BY Roy Mattern Jr.
ATTORNEY

United States Patent Office 3,126,600
Patented Mar. 31, 1964

3,126,600
FASTENER
John M. De Marre, 7940 Seward Park Ave.,
Seattle, Wash.
Filed June 5, 1961, Ser. No. 114,859
1 Claim. (Cl. 24—87)

This invention relates to fasteners and more particularly to fasteners for holding together materials that are pierced by pins.

The purpose of the invention is to provide a fastening pin which has excellent holding power under varying loads as might be expected when the fastened garments are worn by an active person.

An object of this invention is to provide a fastening pin which has piercing hooks that travel a confining path from an overlapping non-use position, to an open position, and then to a substantially overlapping in-use position in such a way that the fastening pin can be stored, handled and used with a high degree of safety.

An object of the invention is to provide a fastening pin which can be made easily and economically in various sizes.

Figure 4:
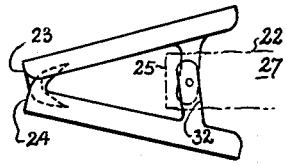
Figure 5:
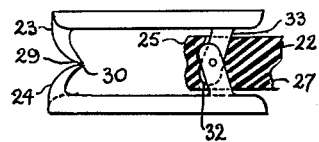
Figure 6:
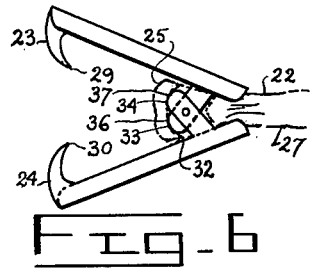
Figure 2:
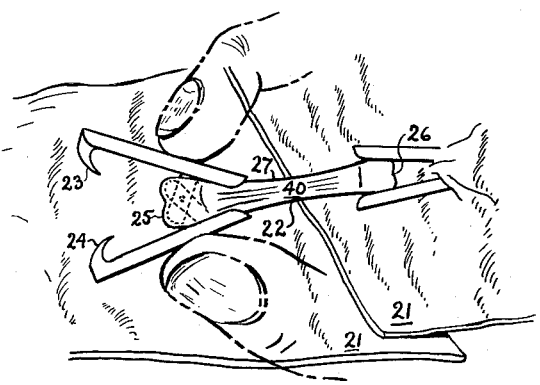
Figure 3:
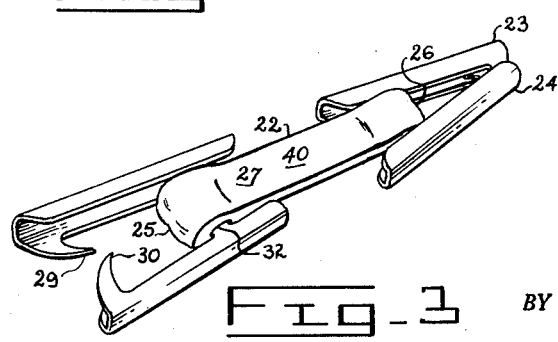

The purpose and objects of this invention will be better understood as the drawings are reviewed while reading the description of the invention. In the drawings:

FIGURE 1 shows an infant wearing diapers fastened in place with the fastening pins, FIGURE 2 illustrates the fastening pin secured to one end portion of a garment and being secured to the other end portion of the garment, FIGURE 3 shows, in perspective, the fastening pin with one end closed and the other end open, FIGURE 4 shows only one end of the fastening pin, in the closed position, FIGURE 5 shows the same end of the fastening pin, in the mid-position, and FIGURE 6 illustrates the same end of the fastening pin, in the wide open position.

Referring to the FIGURE 1, a baby 20 is shown wearing diapers 21 fastened together about him by two of the fastening pins 22. Each fastening pin 22 is drawing together the materials 21 opposite the overlapping or abutting edges of the diapers 21. Each fastening pin 22 comprises two pairs of paired arms 23, 24 arranged in pivotal pairs at each end 25, 26 of a connecting body structure 27. This body structure 27 enhances the holding power of the fastener 22 by its own resilience in its central portion 40 and in a separately distinguishable resilience in each of its ends 25, 26. These ends 25, 26 are formed to hold the paired, pivotal, arms 23, 24 closely in an overlapping status wherein sharp portions of their hooks are closely nestled together substantially keeping these sharp portions lodged one immediately opposite the other avoiding unintentional snagging of hooks.

The resilience of the body structure is observed by comparing the at-rest or non-use shape of the connecting body structure 27 in FIGURE 3 with the stretched or in-use distorted shape of the same body structure 27 in FIGURE 2. When the fastening pin 22 is installed, this preliminary loading of the connecting body structure 27, continues and maintains the garment 21 portions together under all load conditions determined by the wearer's activities.

Moreover, the built-in resilience of the body 27 supplements the resilience of the formed ends 25 and 26. These ends 25 and 26 undergo a resistive distortion in themselves as the paired arms 23, 24 are opened to admit portions of the diaper or garment 21 prior to piercing the garment 21. The resistive distortion force continues to keep the pivoting paired arms 23, 24 together. At all times when the fastening pin 22 is installed, this resistive distortion force is supplemented by the tensile force in the connecting preloaded body structure 27.

In FIGURES 4, 5 and 6, just one formed end 25 of the body 27 is shown with the paired arms 23, 24 in three respective positions. FIGURE 4 illustrates the non-use position where the paired arms 23, 24 are closely held in their end overlapping status with their sharp portions well nested by the ever present inherent resiliency of the formed end 25 of the body 27. FIGURE 5 indicates a midway point in the intended opening action of the paired arms 23, 24 where their end sharp piercing hooks 29 and 30, respectively, are clearing one another. Distortion of the formed end 25 has begun as the loop-like receiving structure 32 is distorted along its major axis by the movement of the lugs 33 and 34 resembling crank-like structure on the other end of the arms 23 and 24.

The lugs 33 and 34 overlap one another and pivot about a common axis 35. The overlapping portions 36 and 37, respectively, on each lug 33 and 34, during the opening of the paired arms 23, 24, rotate along an arm which goes beyond the original configuration limits of the resilient receiving structure 32. The resulting distortion of the body 27 about the resilient receiving structure 32 of the formed end 25 establishes the resistive distortion force which constantly urges the arms 23, 24, with their piercing hooks 29, 30 into their overlapping position as illustrated in FIGURE 4. As the arms 23, 24 are opened fully as shown in FIGURE 6 further distortion occurs in the body 27 about the formed resilient receiving structure 32 enhancing the resistive distortion force.

When the piercing hooks are separated, they can be inserted into any material penetrated by their points. The piercing occurs substantially in the plane of the material 21 itself and often times only the outer layer of several layers of material needs to be pierced in order to get the holding power wanted. The general position of the piercing hooks 29, 30 with respect to the hand of the user and the materials to be joined together is illustrated in FIGURE 2, where one end 25 of the fastener 22 is shown about to be fastened and the other end 26 is shown already fastened. During this fastening operation the body 27, as well as the formed ends 25, 26, are distorted.

As noted previously, when installed the fastener is originally preloaded so that the body 27 and the formed ends 25, 26' resistive distortion forces are constantly tending to keep the piercing hooks 29, 30 together. This preloading keeps the fastened 22 tight during periods of little or no garment force loads. The entire resiliency of the body 27 has enough reserve to expand as necessary to accommodate excessive garment loadings that might otherwise tend to or actually separate the adjacent portions of the materials initially held together by the fastener 22.

The fastener could be made in somewhat different detained configurations than the embodiment shown. For example, the formed ends of the body could be shaped in other patterns and made from any of various known resilient materials. The hook structure could be equipped with different pivoting-assist projections or structure that would likewise distort the shaped formed ends of the body. Any combination, however, of a formed end of a body and the pivoting projection or structure of a hook assembled about the hook pivotal axis to be successful must result in an interference fit. The formed end must distort to create the resistive distortion force that always tends to pivot the hooks 29, 30 together.

The central portion 40 of the body could be made in many configurations and from several different materials, howoever, the central portion 40 of the body 27 always should have a resilient portion permitting the wider spread between the shaped formed fastener ends when the fastener is installed. The holding power of the fastener made and installed in this way will always continue to be effective over the entire range of forces imposed upon it. The resistive forces of both the body and the formed ends will act together to keep the hooks in holding engagement with the material continuously under the variable loads imposed by the wearer of the fastened garments.

I claim:

A fastener for piercing and holding together materials, comprising an elongated, expandable, resilient connector having at each end a formed resilient distortable receiving structure, and paired arms, each having a piercing hook at the outer end, said hooks adapted to overlap when the fastener is not in use, each of said arms having a lug at its inner end tightly imbedded in said receiving structure, the lugs of each pair of arms being pivoted to each other centrally of the said receiving structure, whereby when the hooks of each pair are separated the resilient receiving structure is distorted and when the elongated resilient connector is stretched and the hooks at each end thereof are secured to material, both a resistive distortive force of the distortable receiving structure and a tensile force of the stretched resilient connector combine to maintain the hooks in a holding position.

References Cited in the file of this patent
UNITED STATES PATENTS

| | | |
|---|---|---|
| 202,735 | Lindsay | Apr. 23, 1878 |
| 1,445,798 | Phillips | Feb. 20, 1923 |
| 1,720,295 | Schwartzman | July 9, 1929 |
| 2,195,468 | Patch | Apr. 2, 1940 |
| 2,308,336 | Mason | Jan. 12, 1943 |
| 2,616,393 | Rebarchek | Nov. 4, 1952 |
| 2,621,069 | Anguera | Dec. 9, 1952 |
| 2,628,120 | Triestram | Feb. 10, 1953 |
| 2,637,329 | Reiter | May 5, 1953 |
| 2,671,256 | Duke | Mar. 9, 1954 |
| 2,679,671 | Garber | June 1, 1954 |
| 2,833,014 | Graham | May 6, 1958 |
| 2,856,660 | Twohig | Oct. 21, 1958 |